US011767585B2

(12) United States Patent
Norstrom et al.

(10) Patent No.: US 11,767,585 B2
(45) Date of Patent: Sep. 26, 2023

(54) STEEL WIRE, A METHOD FOR MANUFACTURING THE SAME, AND METHOD FOR MANUFACTURING A SPRING OR MEDICAL WIRE PRODUCTS

(71) Applicants: SUZUKI-SUMIDEN STAINLESS STEEL WIRE CO., LTD, Tokyo (JP); SUZUKI GARPHYTTAN AB, Garphyttan (SE)

(72) Inventors: Johan Norstrom, Orebro (SE); David Thureborn, Garphyttan (SE); Fumito Kanno, Tokyo (JP); Masaki Ishihara, Tokyo (JP)

(73) Assignees: SUZUKI-SUMIDEN STAINLESS STEEL WIRE CO., LTD, Tokyo (JP); SUZUKI GARPHYTTAN AB, Garphyttan (SE)

( * ) Notice: Subject to any disclaimer, the term of this patent is extended or adjusted under 35 U.S.C. 154(b) by 209 days.

(21) Appl. No.: 17/047,795

(22) PCT Filed: Apr. 24, 2019

(86) PCT No.: PCT/JP2019/018464
§ 371 (c)(1),
(2) Date: Oct. 15, 2020

(87) PCT Pub. No.: WO2019/208833
PCT Pub. Date: Oct. 31, 2019

(65) Prior Publication Data
US 2021/0156014 A1    May 27, 2021

(30) Foreign Application Priority Data
Apr. 26, 2018 (SE) .................... 1850505-7

(51) Int. Cl.
*C22C 38/50* (2006.01)
*C21D 7/13* (2006.01)
(Continued)

(52) U.S. Cl.
CPC ............... *C22C 38/50* (2013.01); *C21D 7/13* (2013.01); *C21D 8/065* (2013.01); *C21D 9/0081* (2013.01);
(Continued)

(58) Field of Classification Search
CPC ............. B21C 1/003; C21D 2211/001; C21D 2211/008; C21D 6/004; C21D 6/02;
(Continued)

(56) References Cited

FOREIGN PATENT DOCUMENTS

| CN | 101903551 A | 12/2010 |
|---|---|---|
| CN | 104662189 A | 5/2015 |

(Continued)

OTHER PUBLICATIONS

NPL: on-line translation of JP2012097350, May 2012 (Year: 2012).*
(Continued)

*Primary Examiner* — Jie Yang
(74) *Attorney, Agent, or Firm* — Lathrop GPM LLP; Brian C. Trinque

(57) ABSTRACT

The invention relates to a steel wire suitable for making a spring or medical wire products which remarkably improve the performance of conventional stainless steel wire. The steel comprises (in wt. %): C: 0.02 to 0.15, Si: 0.1 to 0.9, Mn: 0.8 to 1.6, Cr 16 to 20, Ni: 7.5 to 10.5, Mo: ≤3, Al: 0.5 to 2.5, Ti: ≤0.15, N: ≤0.05, optional elements, and impurities, balance Fe, wherein the total amount of Cr and Ni is 25 to 27 wt. %, and wherein the steel has a microstructure including, in volume % (vol. %), martensite: 40 to 90, austenite: 10 to 60, and delta ferrite: ≤5.

16 Claims, 6 Drawing Sheets

(51) Int. Cl.
- *C21D 8/06* (2006.01)
- *C21D 9/00* (2006.01)
- *C21D 9/52* (2006.01)
- *C22C 38/00* (2006.01)
- *C22C 38/02* (2006.01)
- *C22C 38/06* (2006.01)

(52) U.S. Cl.
CPC ............ *C21D 9/525* (2013.01); *C22C 38/001* (2013.01); *C22C 38/02* (2013.01); *C22C 38/06* (2013.01); *C21D 2211/001* (2013.01); *C21D 2211/005* (2013.01); *C21D 2211/008* (2013.01)

(58) Field of Classification Search
CPC .. C21D 7/13; C21D 9/02; C21D 9/525; C22C 1/02; F16F 1/021; F16F 2224/0208; F16F 2226/02
USPC .......................................................... 420/34
See application file for complete search history.

(56) References Cited

FOREIGN PATENT DOCUMENTS

| | | | |
|---|---|---|---|
| CN | 107254642 | A | 10/2021 |
| EP | 0031800 | A1 | 7/1981 |
| EP | 2832876 | A1 | 2/2015 |
| GB | 2073249 | A | 10/1981 |
| JP | 2005-344134 | A | 12/2005 |
| JP | 2012-097350 | A | 5/2012 |
| JP | 2018-021260 | A | 2/2018 |
| WO | 99/31282 | A1 | 6/1999 |

OTHER PUBLICATIONS

Berndt S. and Bengt, B. "New Methods to Improve and Control 17-7 PH Material for Spring Applications", Springs, May 1985.

International Search Report and Written Opinion corresponding to International Patent Application No. PCT/JP2019/018464, dated Oct. 13, 2019.

Japanese Office Action for Japanese Application No. 2021-508681, dated Nov. 2, 2021 with English Translation provided.

Indian Office Action for Indian Patent Application No. 202017042796, dated Feb. 11, 2022, 7 pages.

International Search Report and Written Opinion corresponding to International Patent Application No. PCT/JP2019/018464, dated Jul. 9, 2019.

China Office Action for Chinese Application No. 201980027161.0, dated Aug. 17, 2021 with English Translation for Search Report only.

* cited by examiner

STEEL WIRE, A METHOD FOR MANUFACTURING THE SAME, AND METHOD FOR MANUFACTURING A SPRING OR MEDICAL WIRE PRODUCTS

RELATED APPLICATIONS

This application is a 35 U.S.C. § 371 filing of International Application No. PCT/JP2019/018464, filed Apr. 24, 2019, which application claims priority to Swedish Patent Application No. 1850505-7, filed Apr. 26, 2018. Both of these applications are incorporated by reference in their entireties.

TECHNICAL FIELD

The invention relates to a steel wire, a method for manufacturing the same, and a method for manufacturing a spring or medical wire products. In particular, the invention relates to a precipitation hardening stainless steel suitable for the manufacturing of a spring or medical wire products.

Priority is claimed on Swedish Patent Application No. 1850505-7, filed on Apr. 26, 2018, the contents of which are incorporated herein by reference.

BACKGROUND ART

Precipitation hardening stainless steels embrace a number of alloys such as 17-7PH, 17-4 PH, 15-5 PH, PH 15-7Mo, PH 14-8Mo and PH 13-8Mo.

Steels of the type 17-7 PH are steels that provide high strength and hardness, excellent fatigue properties and good corrosion resistance. 17-7 PH steel is designated EN Number: 1.4568, EN Name: X7CrNiAl 17-7, ASTM: 631, UNS: S17700 and JIS: SUS631. The chemical composition of 17-7 PH is (in wt. %): C: ≤0.09, Si: ≤1, Mn: ≤1, P: ≤0.04, S: ≤0.03, Cr: 16-18, Ni: 6.50-7.75, Al: 0.75-1.50, balance Fe. However, a drawback of 17-7 PH is that work hardening during cold working is remarkable due to the fact that δ-ferrite (delta ferrite) is prone to be generated during casting the steel and the quality of the steel products is deteriorated by the δ-ferrite, and that instability of austenite, which is formed in a steel having the chemical composition of 17-7 PH, tends to invite a stress cracking during cold reduction or after cold reduction. Attempts to remedy these drawbacks have been made in the past. GB 2073249 A discloses the intentional addition of nitrogen to reduce the δ-ferrite for this reason. In addition, there are studies of stress cracking in non-patent literature 1.

Steels of this type are commonly used for parts requiring a high strength and a good toughness. Typical applications for 17-7 PH steels are aircraft parts, springs and washers as well as for cold heading applications. A particular demanding application is as compression springs for diesel injection fuel pumps, because of the work temperature, the corrosive environment and because the helical springs used nowadays often are loaded for more than $10^8$ cycles. WO 9931282A1 discloses that the fatigue properties of a stainless steel wire, of the type 17-7 PH, can be substantially enhanced by subjecting the steel to an ESR-remelting in order to provide an improved cleanliness.

In recent years there has been a strive to replace at least part of the fossil diesel with biomass derived liquid fuels, like Bio Crude Oil (BCO), which are more acid (pH 2.5) and have a higher moisture content than conventional diesel oils.

Hence, it would be desirable to provide a precipitation hardening steel wire having an improved property profile. In particular, it would be advantageous if the mechanical properties could be improved while the corrosion resistance similar to the conventional steel wire is ensured.

CITATION LIST

Patent Literature

[PTL 1]
GB 2073249 A
[PTL 2]
WO 9931282 A1
[Non-PTL 1]
Berndt, S. and Bengt, B. "NEW METHODS TO IMPROVE AND CONTROL 17-7 PH MATERIAL FOR SPRING APPLICATIONS", SPRINGS, May 1985

SUMMARY OF INVENTION

Technical Problem

This invention is directed to an alternative composition of a precipitation hardenable stainless steel wire.

The object of the present invention is to provide a steel wire having an improved property profile. In particular the present invention aims at providing a precipitation hardening stainless steel wire having improved mechanical properties while the corrosion resistance is similar to the conventional steel wire.

As mentioned above, the steel wire made of 17-7PH steel is used for various applications due to its excellent characteristics, it is superior in fatigue resistance as compared with the 18-8 series stainless steel wire, but corrosion resistance and stability in wire drawing process of 17-7PH steel is inferior.

In view of such a current situation, the present invention aims to provide a stainless steel wire excellent in strength, a manufacturing method thereof, and a spring or medical wire products.

A further object is to provide a steel wire, which can be used to obtain a prolonged fatigue life of springs.

The foregoing objects, as well as additional advantages are achieved to a significant measure, by providing a steel wire as defined in the claims.

The invention is defined in the claims.

Solution to Problem

The inventors of the present invention used precipitation hardening type stainless steels in which the $M_{d30}$ value which is indicators of the stability of the austenite phase, the amount of Ni+Cr+Mo contents, and the work hardening index CWH are optimized. In addition, the precipitation hardening type stainless steels were subjected to a manufacturing method comprising wire drawing at room temperature, a manufacturing method comprising cooling to a sub-zero temperature and subsequent wire drawing, or a manufacturing method combining both. As a result, it was found that the metal structure after the final cold working comprising 40 to 90 volume % martensite, 10 to 60 volume % austenite, and 5 volume % or less δ-ferrite is useful for solving the technical problem. Specifically, the amount of martensite after final drawing was preferably 71 to 73%, and the tensile strength was preferably 1680 to 1880 MPa. Furthermore, by subjecting the steel wire to a precipitation hardening treatment at 480° C. for 1 hour, a steel wire having a tensile strength of 2270 MPa which is larger than that of the conventional steel and having a high degree of precipitation hardening was obtained. This makes it possible to achieve much higher strength than the conventional 17-7PH steel wire, the spring using the steel wire has high fatigue strength, and the medical product using the steel wire can obtain high flexural rigidity.

The present invention has been made on the basis of the above-described finding, and the gist is as described below.

(1) A steel wire suitable for making a spring or medical wire products according to an aspect of the present invention includes, in weight %: C: 0.02 to 0.15; Si: 0.1 to 0.9; Mn: 0.8 to 1.6; Cr: 16 to 20; Ni: 7.5 to 10.5; Mo: ≤3; W: ≤0.5; Co: ≤1; Al: 0.5 to 2.5; Ti: ≤0.15; V: ≤0.1; Nb: ≤0.1; Zr: ≤0.1; Ta: ≤0.1; Hf: ≤0.1; Y: ≤50.1; N: ≤0.05; B: ≤0.01; Cu: ≤2.5; S: ≤0.05; P: ≤0.05; Ca: ≤0.01; Mg: ≤0.01; REM: ≤0.2, and Fe and impurities balance, wherein the total amount of Cr and Ni is 25 to 27 wt. %, and wherein the steel wire has a microstructure including in volume %: martensite: 40 to 90; austenite: 10 to 60; and delta ferrite: ≤5.

(2) In the steel wire according to (1), the steel wire may fulfil at least one of the following requirements: C: 0.04 to 0.08; Si: 0.2 to 0.8; Mn: 0.9 to 1.5; Cr: 17.2 to 18.5; Ni: 8.2 to 9.5; Mo: ≤2; W: ≤0.1; Co: ≤0.3; Al: 0.95 to 1.35; Ti: 0.03 to 0.12; V: ≤0.1; Nb: ≤0.05; Zr: ≤0.05; Ta: ≤0.05; Hf: ≤0.05; Y: ≤0.05; N: ≤0.018; B: ≤0.005; Cu: ≤0.3, and; S: ≤0.005, optionally the steel wire may have the microstructure including in volume %, the martensite: 50 to 80; the austenite: 20 to 50; and the delta ferrite: ≤3, and optionally the steel wire may fulfil one or both of $M_{d30}$ (° C.)=−40 to 10, and CWH=113 to 133, in which $M_{d30}$ and CWH are calculated by the following equations, $$M_{d30}(° C.)=551-462\times(C+N)-9.2\times Si-8.1\times Mn-13.7\times Cr-29\times(Ni+Cu)-18.5\times Mo-68\times Nb-1.42\times(\text{ASTM Grain Size}-8.0)$$

$$CWH=392-7.3\times Cr-17.2\times Ni+135\times C.$$

(3) In the steel wire according to (1) or (2), the steel wire may fulfil at least one of the following requirements: C: 0.06 to 0.08; Si: 0.25 to 0.75; Mn: 0.9 to 1.5; Cr: 17.4 to 18.2; Ni: 8.5 to 9.1; Mo: ≤2; W: ≤0.1; Al: 1.00 to 1.30; Ti: 0.05 to 0.10; N: 0.004 to 0.017; Cu: ≤0.3, and; S: ≤0.003, optionally the steel wire may have a microstructure including in volume %: the martensite: 50 to 80, and the austenite: 20 to 50, and optionally the steel wire may fulfil at least one of $M_{d30}$ (° C.)=−20 to 0, and CWH=118 to 130

(4) In the steel wire according to (3), the steel wire may fulfil at least one of the following requirements: C: 0.06 to 0.08; Si: 0.25 to 0.75; Mn: 0.9 to 1.5; Cr: 17.4 to 18.2; Ni: 8.5 to 9.1; Mo: ≤1; W: ≤0.1; Al: 1.00 to 1.30; Ti: 0.05 to 0.10; Cu: ≤0.3, and; S: ≤0.003, optionally the steel wire may have a microstructure including in volume %: the martensite: 50 to 80, and the austenite: 20 to 50, and optionally the steel wire may fulfil at least one of $M_{d30}$ (° C.)=−12 to −2, and CWH=120 to 126.

(5) In the steel wire according to any of (1) to (4), the steel wire may have a cleanliness fulfilling the following maximum requirements with respect to non-metallic inclusions according to ASTM E45-97, Method A:

TABLE 1

| A | A | B | B | C | C | D | D |
|---|---|---|---|---|---|---|---|
| T | H | T | H | T | H | T | H |
| 1.0 | 0 | 1.5 | 1.0 | 0 | 0 | 1.5 | 1.0 | optionally number of non-metallic inclusions having a maximum size within the range of 10 to 15 μm in a 350 mm² large inspected area may be ≤10, and optionally the number of non-metallic inclusions having a size larger than 15 μm may be zero in said area.

(6) In the steel wire according to any one of (1) to (5), the total amount of Cr, Ni, and Mo may be 25 to 27 wt. %.

(7) In the steel wire according to claim 6, wherein the wire may fulfil the following requirements: C: 0.02 to 0.09; Si: 0.1 to 0.9; Mn: 0.8 to 1.6; Cr: 17 to 19; Ni: 8 to 10; Mo: ≤1; W: ≤0.5; Co: ≤1; Al: 0.9 to 1.4; Ti: ≤0.15; V: ≤0.1; Nb: ≤0.1; Zr: ≤0.1; Ta: ≤0.1; Hf: ≤0.1; Y: ≤0.1; N: ≤0.02; B: ≤0.01; Cu: ≤2.5; S: ≤0.05; P: ≤0.05; Ca: ≤0.01; Mg: ≤0.01; REM: ≤0.2, and Fe and impurities balance.

(8) A method for manufacturing a steel wire according to any one of (1) to (7) includes: melting a raw material having a composition as described above to obtain an ingot or a billet; optionally, subjecting the ingot or the billet to one or more selected from the group consisting of Electro Slag Remelting method, Vacuum Arc Remelting method, Electron Beam Remelting method, and Plasma Arc Remelting method; hot working the ingot or the billet to obtain a wire rod; optionally, shaving the wire rod; optionally, annealing the shaved wire rod; intermediate drawing the wire rod to obtain an intermediate drawn wire having an intermediate diameter; annealing the intermediate drawn wire; pre-drawing the intermediate drawn wire to obtain a pre-drawn wire having a pre diameter; sub-zero cooling the pre-drawn wire; and final drawing the pre-drawn wire to obtain the steel wire having a final diameter.

(9) In the method for manufacturing the steel wire according to (8), a working rate during the pre-drawing the intermediate drawn wire may be 30 to 60%.

(10) In the method for manufacturing the steel wire according to claim 8 or 9, the surface temperature of the pre-drawn wire just before the final drawing may be −130 to −196° C., and a working rate during the final drawing the pre-drawn wire may be 10 to 30%.

(11) A method for manufacturing a steel wire according to any one of (1) to (7) includes: melting a raw material having a composition as described above to obtain an ingot or a billet; optionally, subjecting the ingot or the billet to one or more selected from the group consisting of Electro Slag Remelting method, Vacuum Arc Remelting method, Electron Beam Remelting method, and Plasma Arc Remelting method; hot working the ingot or the billet to obtain a wire rod; optionally, shaving the wire rod; optionally, annealing the shaved wire rod; optionally, one or more times of intermediate drawing the wire rod to obtain an intermediate drawn wire having an intermediate diameter; optionally, one or more times of annealing the intermediate drawn wire; and final drawing the wire rod, the shaved wire rod, or the intermediate drawn wire to obtain the steel wire having a final diameter.

(12) In the method for manufacturing the steel wire according to claim (11), a working rate during the final drawing may be 70 to 96%.

(13) A method for manufacturing a spring or medical wire products according to other aspect of the present invention includes: working the steel wire according to any one of (1)

to (7) to obtain a shape of the spring or the medical wire products; and precipitation hardening the spring or the medical wire products.

(14) A method for manufacturing a spring or medical wire products according to other aspect of the present invention includes: manufacturing a steel wire by the method according to any one of (8) to (12), working the steel wire to obtain a shape of the spring or the medical wire products; and precipitation hardening the spring or the medical wire products.

Advantageous Effects of Invention

According to the above aspect of the present invention, it is possible to provide a steel wire, which can be used to obtain a steel wire having an improved property profile. In particular, according to the above aspect of the present invention, it is possible to provide a precipitation hardening stainless steel wire having improved mechanical properties while the corrosion resistance is similar to the conventional steel wire. In addition, according to the above aspect of the present invention, it is possible to provide a stainless steel wire excellent in strength, a manufacturing method thereof, and a spring or medical wire products. Moreover, according to the above aspect of the present invention, it is possible to provide a steel wire, which can be used to obtain a prolonged fatigue life of springs.

DESCRIPTION OF EMBODIMENTS

Figure 1:
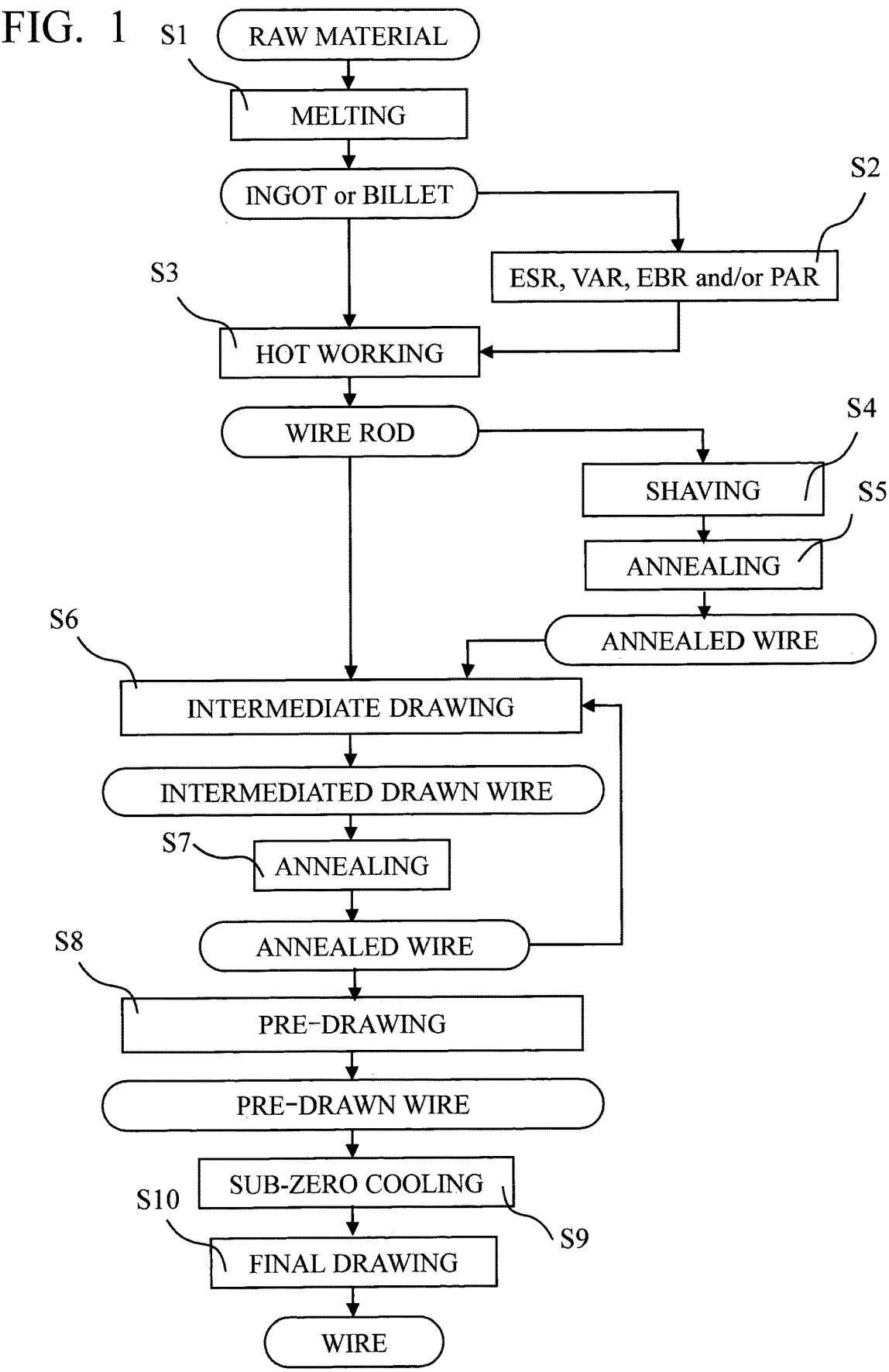
FIG. 1 A flowchart showing an example of method for manufacturing steel wire.

The importance of the separate elements and their interaction with each other as well as the limitations of the chemical ingredients of the alloy according to the present embodiment are briefly explained in the following. All percentages for the chemical composition of the steel which is used for this invention wire are given in weight % (wt. %) throughout the description. The amount of phases in the microstructure is given in volume % (vol. %). Upper and lower limits of the individual elements can be freely combined within the limits set out in the claims.

Carbon (0.02-0.15%)

Carbon is a strong austenite former and carbon is also effective for improving the strength and the hardness of the steel matrix. C should be present in a minimum content of 0.02%. The lower limit may be set to 0.03, 0.04, 0.05 or 0.06%. However, if the content is too high the steel may be prone to the formation of chromium carbides. The upper limit for carbon is therefore 0.15%. The upper limit may be set to 0.10, 0.09, 0.08 or 0.07%.

Silicon (0.1-0.9%)

Silicon is used for deoxidation. Si is also a strong ferrite former. Si is therefore limited to 0.9% or less. The upper limit may be 0.85, 0.8, 0.75 or 0.70%. The lower limit may be 0.15, 0.2 or 0.25%.

Manganese (0.8-1.6%)

Manganese is an austenite stabilizing element and contributes to the deoxidation and to the hardenability of the steel. If the content is too low, then the hardenability may be too low. Manganese shall therefore be present in a minimum content of 0.8%. The lower limit may be set to 0.9, 1.0 or 1.1%. The upper limit may be set to 1.5, 1.4 or 1.3% for avoiding too stable austenite.

Chromium (16-20%)

Chromium is to be present in a content of at least 16% in order to make the steel stainless and to provide a good corrosion resistance. However, high amounts of Cr may lead to the formation of high-temperature ferrite, which reduces the hot-workability. The lower limit may be 16.5, 17, 17.1, 17.2, 17.3 or 17.4%. The upper limit Cr is 20% and the amount of Cr may be limited to 19.5, 19, 18.8, 18.6, 18.5, 18.4, or 18.2%. A preferred range is 17.4-18.2%.

Nickel (7.5-10.5%)

Nickel is an austenite stabilizer and supress the formation of delta ferrite. Nickel gives the steel a good hardenability and toughness. Nickel is also beneficial for the machinability of the steel. Nickel is essential for the precipitation hardening as it together with Al forms minute intermetallic NiAl— and/or $Ni_3Al$— particles during aging. However, excess Ni additions results in too high an amount of retained austenite. The lower limit is 7.5% and may be set to 7.7, 8, 8.2, 8.3, 8.4, 8.4, 8.5 or 8.6%. The upper limit is 10.5% and may be set to 10.2, 10, 9.8, 9.7, 9.6, 9.5, 9.4, 9.3, 9.2 or 9.1%.

Chromium+Nickel (25-27%)

In order to obtain an optimized strength and toughness it is desirable, that the total content of Cr, and Ni is 25-27%. The lower amount may be 25.2, 25.3, 25.4 or 25.5%. The upper limit may be 26.9, 26.8, 26.7 or 26.6%.

Molybdenum (≤3%)

Mo is a strong carbide-forming element and also a strong ferrite former. However, when Mo is dissolved in the matrix, Mo contributes to stabilization of austenite and improvement of corrosion resistance. During precipitation hardening treatment, fine clusters containing Mo are precipitated in martensite, leading to high strength and improved heat resistance. However, when Mo is excessively added, the formation of strain-induced martensite during the final processing is suppressed, leading to shortage of the amount of strain-induced martensite for precipitation hardening. For this reason, the amount of Mo is limited to 3% or less. The upper limit may be 2.8, 2.5, 2, 1, 0.8, 0.6, 0.4 or 0.2%.

Chromium+Nickel+Molybdenum (Preferably, 25-27%)

In order to obtain an optimized strength and toughness it is desirable, that the total content of Cr, Ni and Mo may be 25-27%. The lower amount may be 25.2, 25.3, 25.4 or 25.5%. The upper limit may be 26.9, 26.8, 26.7 or 26.6%.

Aluminium (0.5-2.5%)

In the present invention, Al is an essential element for improving the strength. During aging treatment, Al bonds with Ni to form intermetallic compounds, which finely precipitate in the martensitic structure and gives high strength properties. In order to obtain the precipitation amount necessary for strengthening, addition of Al of 0.5% or more is necessary. On the other hand, if Al is excessively added, the amount of the intermetallic compounds to be precipitated becomes excessive, the amount of Ni in the matrix phase decreases, and the toughness decreases, so the upper limit is limited to 2.5%. The upper limit can be 2.4, 2.2, 2.0, 1.8, 1.6, 1.4, 1.35, 1.30, 1.25, 1.20 or 1.15%. The lower limit can be set to 0.6, 0.7, 0.8, 0.9, 0.95 or 1.00%.

Tungsten (≤0.5%)

The lower limit of W is 0%. The lower limit of W may be 0.001, 0.002, 0.005, or 0.010%. On the other hand, W is an element effective not only for improving the creep strength of stainless steel but also for improving corrosion resistance, it may be contained. However, excessive addition of W leads to the formation of intermetallic compounds, which may lead to degradation of corrosion resistance, so the W content should be 0.5% or less. The upper limit of W may be 0.1%.

Cobalt (≤1%)

The lower-limit of Co is 0%. The lower limit of Co may be 0.001, 0.002, 0.005, or 0.010%. On the other hand, in order to secure ductility and improve heat resistance, Co may be added in an amount of 0.1% or more as necessary. However, when it is added in an amount exceeding 1%, the strength is lowered and the heat resistance deteriorates, so the upper limit is 1%. It is preferably 0.3% or less.

Boron (≤0.01%)

The lower limit of B is 0%. The lower limit of B may be 0.001, 0.002, 0.005, or 0.010%. On the other hand, B is an optional element that can be used in small amounts in order to improve the hot workability of the stainless steel wire. B also has the function of improving the strength of grain boundary. However, when the content exceeds 0.01%, the workability deteriorates by the formation of the boron compound. Therefore, the upper limit may then be set to 0.007, 0.006, 0.005 or 0.004%.

Nitrogen (≤0.05%)

The lower limit of N is 0%. N is a strong austenite former and also a strong nitride former such as AlN. In order to avoid too large an amount of AlN to be precipitated, the upper limit of the nitrogen content is limited to 0.05%. The upper limit may be set to 0.02, 0.019, 0.018 and 0.017%. However, a small and controlled amount of nitrogen may be beneficial for obtaining a small austenite grain size in that N combine with Ti and Al to form minute nitrides. The lower limit may therefore, optionally, be set to 0.004, 0.005 or 0.006%.

Copper (≤2.5%)

The lower limit of Cu is 0%. The lower limit of Cu may be 0.001, 0.002, 0.005, or 0.010%. On the other hand, Cu is an austenite stabilizing element. Cu may contribute to increase the hardness and the corrosion resistance of the steel. The ε-Cu phase formed during aging not only reinforces the steel by precipitation hardening but also influences on the precipitation kinetics of the intermetallic phases.

However, it is not possible to extract copper from the steel once it has been added. This makes the scrap handling more difficult. For this reason, copper is an optional element in the present invention and the upper limit may be 1.0, 0.5, 0.3, 0.2 or 0.1%.

Titanium (≤0.15%)

Ti is an element having the effect of improving the strength of the alloy by precipitation hardening as same as Al. However, Ti has a larger austenite stabilization function than Al, excessive addition suppresses the formation of strain-induced martensite during cold working and invites insufficient amount of strain-induced martensite required for precipitation hardening, so therefore, Ti is set to 0.15% or less. The upper limit may be set to 0.14, 0.13, 0.12, 0.11, 0.10, 0.09 or 0.08%. Further, if the above-mentioned Al sufficiently improves the strength by precipitation hardening, addition of Ti is not necessarily required, and Ti may be 0% (no addition). The lower limit of Ti may be 0.001, 0.002, 0.005, 0.001, 0.01, 0.03, or 0.05%.

V, Nb, Zr, Ta, Hf and Y (≤0.1%)

V, Nb, Zr, Ta, Hf and Y are strong carbide and nitride formers. The content of each of these elements should therefore be limited to 0.1% or less, in order to avoid the formation of undesired carbides and nitrides. The maximum amount of these elements is preferably 0.05 or even 0.01%. The lower limit of the amount of these elements may be 0, 0.001, 0.002, 0.005, or 0.010%.

Ca, Mg and REM (Rare Earth Metals)

These elements may be added to the steel in the amounts according to the present embodiment for modifying the non-metallic inclusion. However, when the content of each of these elements exceeds the respective upper limit values, there is a possibility that they become coarse inclusions and lead to fatigue strength deterioration of the steel wire. Therefore, the amount of Ca and Mg are set to 0.01% or less, respectively, and the amount of REM is set to 0.2% or less. The lower limit of the amount of these elements may be 0, 0.001, 0.002, 0.005, or 0.010%.

Sulphur (≤0.05%)

S is an impurity. The upper limit shall therefore be 0.05%. However, preferably the upper limit is set to 0.015, 0.010, 0.005, 0.003, 0.002 or even 0.001%. The lower limit of the amount of S may be 0, 0.001, 0.002, or 0.005%.

Phosphorus (≤0.05%)

P is an impurity element, which may have a negative effect on the mechanical properties of the steel. P may therefore be limited to 0.05, 0.04, 0.03 0.02 or 0.01%. The lower limit of the amount of P may be 0, 0.001, 0.002, 0.005, or 0.010%.

The remainder (balance) of the chemical composition of the steel wire according to the present embodiment includes impurities, and Fe as balance. "Impurities" refer to components which mix into steel wire during the industrial production of the steel wire due to raw materials such as minerals or scraps or a variety of causes in production processes and are allowed to be included as long as the present steel wire is not adversely affected.

The microstructure of the steel can be adjusted with respect to the intended use.

The $M_s$-temperature of steels of 18-8 series, EN number: 1.4325, EN name: X12CrNi188, ASTM: 302, UNS: S30200, JIS: SUS302 or ASTM: 304, UNS: S30400, and JIS: SUS304, which are representative as metastable austenite stainless steel, is calculated to be less than −273° C., in according to the calculation Eq.(1). This means that the metal structure of these metastable austenite stainless steels do not transform to martensite even when immersed in liquid nitrogen (boiling point−196° C.).

$$Ms\ (°\ C.)=502-810\times C-1230\times N-13\times Mn-30\times Ni-12\times Cr-54\times Cu-46\times Mo \quad (1)$$

However, because cold working promotes the decomposition of the austenite, the martensite starts to form at a temperature higher than the $M_s$-temperature, when the steel is subjected to cold working. The degree to which this happens varies with the composition and the grain size as shown in Eq. (2).

$$M_{d30}\ (°\ C.)=551-462\times(C+N)-9.2\times Si-8.1\times Mn-13.7\times Cr-29\times(Ni+Cu)-18.5\times Mo-68\times Nb-1.42\times (ASTM\ Grain\ Size-8.0) \quad (2)$$

This is the temperature at which 50 vol. % of the austenite will be transformed to martensite through cold deformation of 30% true strain (about 25% area reduction). A higher temperature means higher deformation hardening in the steel. The $M_{d30}$-temperature for the steel wire according to the present embodiment may be −40° C. or more, −20° C. or more, or −12° C. or more. The Mo-temperature for the steel wire according to the present embodiment may be 10° C. or less, 0° C. or less, or −2° C. or less.

The steels propensity to cold work hardening can be estimated by using the Cold Work Hardening (CWH) factor as shown in Eq. (3):

$$CWH = 392 - 7.3 \times Cr - 17.2 \times Ni + 135 \times C \qquad (3)$$

The lower limit of CWH may be 113, 118, or 120. The upper limit of CWH may be 133, 130, or 126.

Accordingly, the amount of martensite in the microstructure will depend on the chemical composition of the steel, the austenite grain size, the area reduction as well as on the deformation temperature. In a preferred embodiment of the present invention, an example of a method for manufacturing the steel wire (see FIG. 1, hereinafter referred as "A-type manufacturing method") includes:

(S1) melting a raw material having a composition as described above to obtain an ingot or a billet;
(S2) optionally, subjecting the ingot or the billet to one or more selected from the group consisting of Electro Slag Remelting method (ESR), Vacuum Arc Remelting (VAR) method, Electron Beam Remelting method (EBR), and Plasma Arc Remelting method (PAR) in order to improve the cleanliness of the ingot or the billet;
(S3) hot working the ingot or the billet to obtain a wire rod;
(S4) optionally, shaving the wire rod;
(S5) optionally, annealing the shaved wire rod;
(S6) intermediate drawing the wire rod to obtain an intermediate drawn wire having an intermediate diameter;
(S7) annealing the intermediate drawn wire;
(S8) pre-drawing the intermediate drawn wire to obtain a pre-drawn wire having a pre diameter,
(S9) sub-zero cooling the pre-drawn wire; and
(S10) final drawing the pre-drawn wire to obtain the steel wire having a final diameter.

In the melting S1, a raw metal is melted to obtain an ingot or a billet. A composition of the raw material is substantially equal to the above-described composition of the steel wire according to the present invention. The conditions for performing the melting Si are not limited, and typical conditions can be applied to the melting S1.

The remelting S2 such as ESR, VAR, EBR and/or PAR may be included in the method. If the steel wire is intended to be used in applications having very high requirements on the fatigue strength such as compression springs for diesel injection then it is preferred to have a super clean steel. Hence, the ingot or the billet may be subjected to one or more selected from the group consisting of Electro Slag Remelting method (ESR), Vacuum Arc Remelting (VAR) method, Electron Beam Remelting method (EBR), and Plasma Arc Remelting method (PAR), and/or similar method in order to improve the cleanliness of the steel. The remelting methods can be combined, and thus, the method may include two or more of the remelting methods. The conditions for performing the remelting S2 are not limited, and typical conditions can be applied to the remelting S2.

In the hot working S3, the ingot or the billet is heated and worked so as to obtain a wire rod. An example of the hot working is hot rolling. The conditions for performing the hot working S3 are not limited, and typical conditions can be applied to the hot working S3.

The shaving S4 may include light drawing before the shaving, and the shaving S4 and the annealing S5 may be included in the A-type manufacturing method. The shaving S4 remove the surface layer of the wire rod so that the surface defects of the wire rod, which deteriorate the mechanical property of the finally obtained steel wire, are removed. Therefore, the shaving S4 further enhances the mechanical property of the steel wire. The shaved wire rod after the shaving S4 is annealed. The annealing S5 is performed in order to soften the shaved wire rod, which is hardened by the shaving S4. Therefore, if the shaving S4, and the annealing S5 are not included in the A-type manufacturing method, the annealing is not also included therein. If the shaving S4, and the annealing S5 are included in the A-type manufacturing method, a heating temperature during the annealing S4 may be 980 to 1100° C.

In the intermediate drawing S6, the wire rod is drawn and an intermediate drawn wire having an intermediate diameter is obtained. In the annealing S7, the intermediate drawn wire, which is hardened by the intermediate drawing S6, is softened. In the A-type manufacturing method, drawing the wire rod is performed in plurality times (for example, two or more) with avoiding wire breakage in order to obtain the ratio of austenite phase and martensite phase (or austenite phase, martensite phase, and delta ferrite phase) required in the final wire drawing process. Therefore, the manufacturing method may further include one or more of intermediate drawing. However, as the B-type manufacturing method as described below, the wire rod can be drawn so as to be the final diameter in one time. The reduction ratio during the intermediate drawing S6 is not limited, and can be selected in accordance with the final wire diameter. Therefore, in the case of fine size at finale drawing, intermediate drawing process will take plural times. The intermediate diameter, which is smaller than the diameter of the wire rod just before the intermediate drawing S6 and larger than the diameter of a pre diameter, is not limited. A heating temperature during the annealing S7 may be 980 to 1100° C.

In the pre-drawing S8, the intermediate drawn wire is drawn to obtain a pre-drawn wire having a pre diameter. In the pre-drawing S8, a working rate (i.e. reduction of area) is 30 to 60%. The working rate may be 40 to 50%. In addition, the pre-drawn wire includes 10 volume % or less of strain-induced martensite. The larger the working rate of the pre-drawing S8 is, the larger the amount of the strain-induced martensite in the pre-drawn wire is.

The sub-zero cooling S9 is included in the A-type manufacturing method. The presence of martensite in steels is indispensable for obtaining high strength in precipitation hardening, and in order to further increase the amount of martensite, it is necessary for the A-type manufacturing method to cool the steel wire to the sub-zero temperature just before final drawing the pre-drawn wire. The sub-zero cooling S9 can be made by means of all conventionally known cryogenic cooling media. However, it is preferred to make use of liquid nitrogen for the cryogenic treatment.

In the final drawing S10, the pre-drawn wire is further drawn to obtain the steel wire having a final diameter. In the final drawing S10, a working rate (i.e. reduction of area) is preferably 10 to 30% (more preferably, 15 to 28%), and the surface temperature of the pre-drawn wire just before the final drawing S10 may be −130 to −196° C. The upper limit of the surface temperature of the pre-drawn wire just before the final drawing S10 is more preferably −190° C. In the final drawing S10, the pre-drawn wire and final drawn wire may be formed by conventional die, rolled or drawn by rollers. Also, the cross-sectional shape of the steel wire after the final working may be not only round cross section but also egg shape, oval shape, modified cross section similar to these, flat shape or any other shape. The drawing tools and the cross-sectional shapes can be applied to the other shape.

Figure 2:
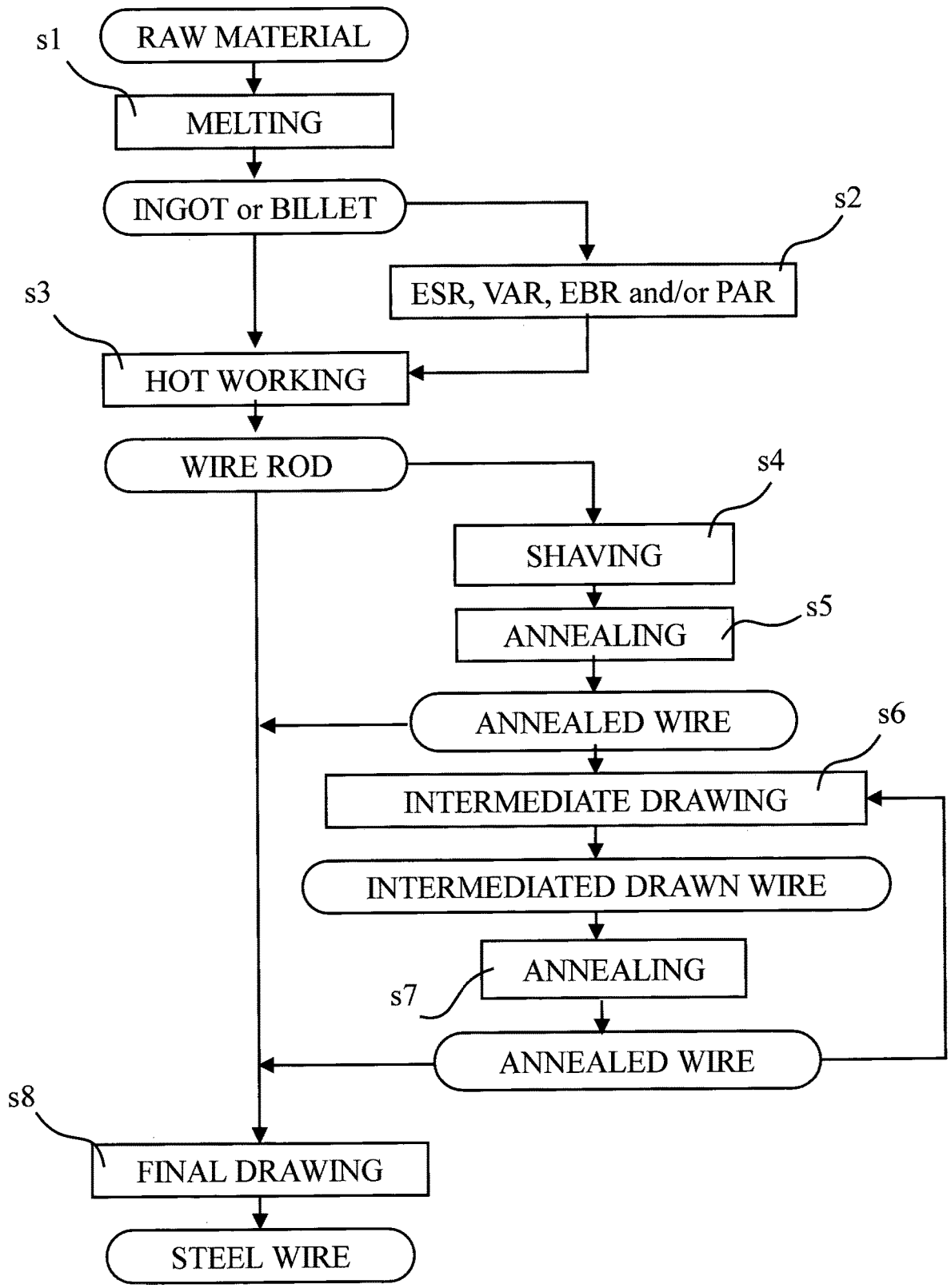
FIG. 2 A flowchart showing the other example of method for manufacturing steel wire.

In a preferred embodiment of the present invention, the other example of a method for manufacturing the steel sheet (see FIG. 2, hereinafter referred as "B-type manufacturing method") includes:

(s1) melting a raw material having a composition as described above to obtain an ingot or a billet;

(s2) optionally, subjecting the ingot or the billet to one or more selected from the group consisting of Electro Slag Remelting method (ESR), Vacuum Arc Remelting (VAR) method, Electron Beam Remelting method (EBR), and Plasma Arc Remelting method (PAR) in order to improve the cleanliness of the ingot or the billet;

(s3) hot working the ingot or the billet to obtain a wire rod;

(s4) optionally, shaving the wire rod;

(s5) optionally, annealing the shaved wire rod;

(s6) optionally, one or more times of intermediate drawing the wire rod to obtain an intermediate drawn wire having an intermediate diameter;

(s7) optionally, one or more times of annealing the intermediate drawn wire; and (s8) final drawing the wire rod, the shaved wire rod, or the intermediate drawn wire to obtain the steel wire having a final diameter. Artificial direct cooling (for example, sub-zero cooling) is not essential for the B-type manufacturing method, but may be included therein.

The melting s1, the remelting s2, the hot working s3, the shaving s4, and the annealing s5 for the shaved wire rod in the B-type manufacturing method are similar to the melting S1, the remelting S2, the hot working S3, the shaving S4, and the annealing S5 for the shaved wire rod in the A-type manufacturing method, respectively.

In the B-type manufacturing method, the intermediate drawing s6 and the subsequent annealing s7 is optional. That is, the intermediate drawing s6 may be omitted and the wire rod may be drawn in one time in the final drawing s8. The working rate (i.e. reduction of area) in the final drawing s8 is 70 to 96%. On the other hand, the intermediated drawing s6 and the subsequent annealing s7 may be performed one or more times in order to control the working ratio in the final drawing s8.

Hence, the amount of martensite can be adjusted to the desired value. For many applications, it is desirable to have a mixture of austenite and martensite in the microstructure. The microstructure may include 40-90 vol. % martensite, 10-60 vol. % austenite and not more than 5 vol. % delta ferrite.

The amount of delta ferrite should preferable be limited to 3 vol. % for not impairing the hot workability. The amount of austenite in the structure may be 20 vol. % or more. The amount of martensite may be 50 vol. % or more. The amount of austenite in the structure may be 50 vol. % or less. The amount of martensite may be 80 vol. % or less.

The amount of strain-induced martensite included in the steel wire according to the present embodiment is evaluated in accordance with the following Eq. (4), which is disclosed in "Study of the High Strength Stainless Steel wires for Springs", Koizumi et al., Transactions of Japan Society of Spring Engineers No. 36, p 25 to p 28, 1983, Japan Society of Spring Engineers.

$$\text{VFM (\%)} = \sigma_{S(UK)}/\sigma_{S(M)} \times 100 \qquad (4)$$

In the Eq. (4), "VFM" is volume fraction of martensite included in the steel wire, "$\sigma_{S(UK)}$" is saturation magnetization of the steel wire, and "$\sigma_{S(M)}$" is saturation magnetization of a reference sample of which the amount of martensite is 100 vol. %.

"$\sigma_{S(UK)}$" is calculated in accordance with the following Eq. (5).

$$\sigma_{S(UK)} = B_{S(UK)}/4\pi\rho \qquad (5)$$

In the Eq. (5), "ρ" is density of the steel wire, and "$B_{S(UK)}$" is saturation magnetic flux density Bs of the steel wire, which is obtained by applying ±1000 Oe of magnetizing force to the steel wire with solenoidal coil and DC-magnetizing device (for example, Type 3257 of Yokogawa Electric Corporation) to obtain B-H curve (magnetic flux density–magnetization curve) thereof, evaluating the maximum magneticflux density Bm based on the B-H curve, and assuming Bm as Bs.

"$\sigma_{S(M)}$" can be estimated in accordance with the following Eq. (6) for the chemical composition of the steel wire as described above.

$$\sigma_{S(M)} = 214.5 - 3.12 \times \{Cr\,(\%) + (\tfrac{1}{2}) \times Ni\,(\%)\} \qquad (6)$$

VFM obtained with the Eq. (4) includes the amount of α' martensite having bcc structure and delta ferrite having bcc structure, and excludes the amount of ε martensite having hcp structure. Although the amount of the ε martensite is extremely small and can be ignored, the amount of delta ferrite is omitted from VFM in accordance with the following evaluation method in order to precisely approximate the amount of strain-induced martensite included in the steel wire according to the present embodiment.

The evaluation of the delta ferrite is performed on the wire rod. In the steel wire before drawing, i.e. the wire rod, the metal structure is mainly constructed from the austenite and the delta ferrite. The drawing transforms a part of the austenite to the strain-induced martensite, while does not transform the delta ferrite. That is, the amount of the delta ferrite before the drawing and the amount of the delta ferrite after the drawing are substantially equal. In addition, the VFM before the drawing is substantially equal to the amount of the delta ferrite. Accordingly, difference between VFM before the drawing and VFM after the drawing is assumed as the amount of the strain-induced martensite after the drawing.

If the amount of the delta ferrite of the wire rod (i.e. the VFM before the drawing) is unknown and the amount of the strain-induced martensite of the steel wire cannot be estimated based thereon, the amount of delta ferrite before the drawing can be estimated by annealing the steel wire in order to cause transformation from the strain-induced martensite to the austenite (i.e. reproducing the metal structure of the wire rod in the steel wire) and taking measurement the amount of delta ferrite of the annealed steel wire.

The amount of austenite is substantially equal to an amount of remainder of the strain-induced martensite and the delta ferrite.

If the steel is intended to be used in applications having very high requirements on the fatigue strength such as compression springs for diesel injection then it is preferred to have a super clean steel. Hence, the steel may be subjected to Electro Slag Remelting (ESR) method, Vacuum Arc Remelting (VAR) method or both methods and/or similar method in order to improve the cleanliness of the steel.

It is possible to use ESR, Vacuum Arc Remelting (VAR) method or both methods or/and similar method in order to produce a steel, which has a cleanliness fulfilling the following maximum requirements with respect to non-metallic inclusion according to ASTM E45-97, Method A:

TABLE 2

| A | A | B | B | C | C | D | D |
|---|---|---|---|---|---|---|---|
| T | H | T | H | T | H | T | H |
| 1.0 | 0 | 1.5 | 1.0 | 0 | 0 | 1.5 | 1.0 |

Moreover, the number of non-metallic inclusions having a maximum size within the range of 10 to 15 μm in a 350 mm² large inspected area may be ≤10, and the number of non-metallic inclusions having a size larger than 15 μm is zero in said area. The non-metallic inclusions act as fracture origins during gigacycle fatigue test (such as $10^7$ times or more of fatigue life). Accordingly, the non-metallic inclusions is one of the factor decreasing fatigue strength. Therefore, the number of the non-metallic inclusions may be limited as described below.

Figure 6:
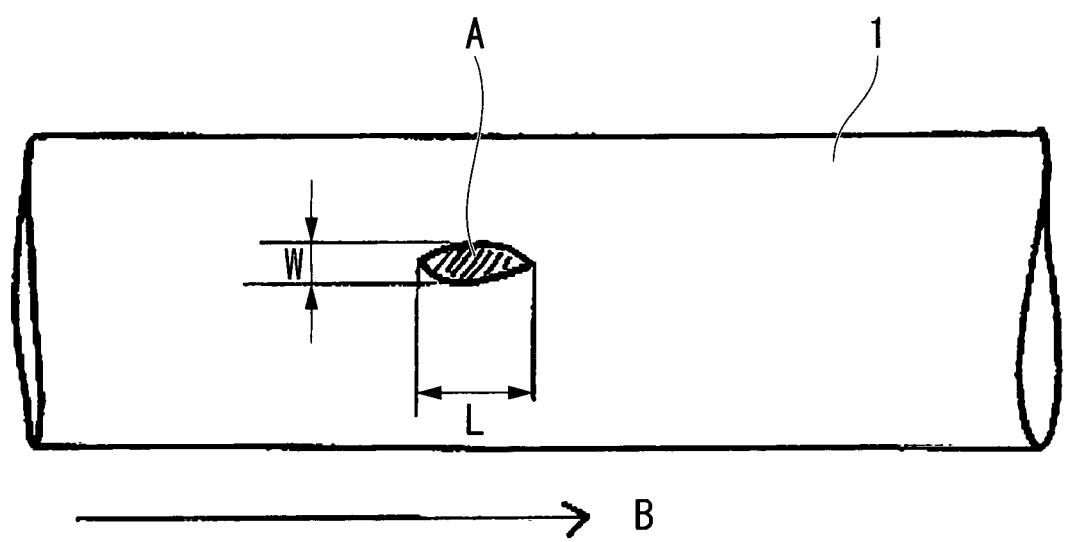
FIG. 6 A cross sectional view of steel wire parallel to axis direction.

The evaluation of the number of non-metallic inclusions A is performed as follows. One or more of sample is sampled from the coil. The inspection should be evenly distributed between the coils. The zone from the surface to the depth of 1 mm shall be inspected. The inclusion size is to be measured as the width, w (see FIG. 6, which is a cross sectional view of steel wire parallel to axis direction B). 350 mm² of every ESR-heat shall be inspected. Inclusions having sizes of 10 to 15 μm, as well as inclusions having sizes of larger than 15 μm are counted accordingly to the JK-scale on the area with the highest concentration of inclusions.

Figure 3:
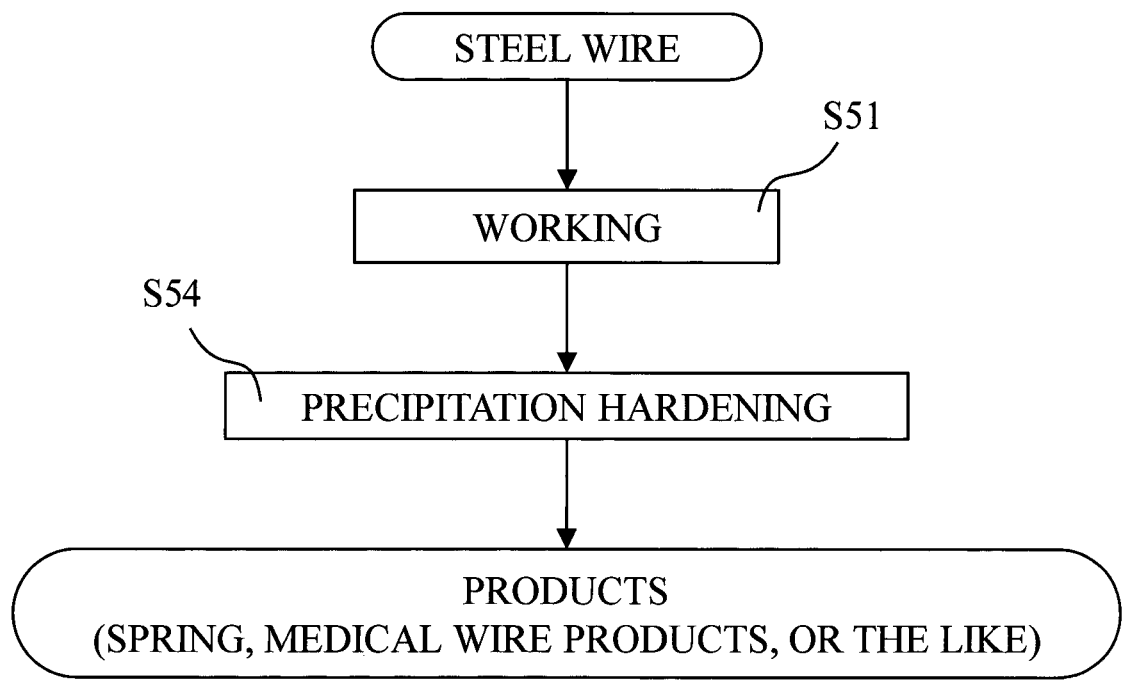
FIG. 3 A flowchart showing an example of method for manufacturing steel products using the inventive steel wire.

Although a use of the steel wire of the present invention is not limited, it is preferable for the steel wire to be used for obtaining a spring or medical wire products (for example, a surgical needle). An example of a method (See FIG. 3) for manufacturing a spring and medical wire products includes:
(S51) working the steel wire according to the present invention to obtain a shape of the spring or the medical wire products, and
(S54) precipitation hardening the spring or the medical wire products.

Other example of a method for manufacturing a spring and medical wire products includes:
manufacturing a steel wire by the method according to the present invention (omitted in FIG. 3),
(S51) working the steel wire to obtain a shape of the spring or the medical wire products, and
(S54) precipitation hardening the spring or the medical wire products.

Figure 4:
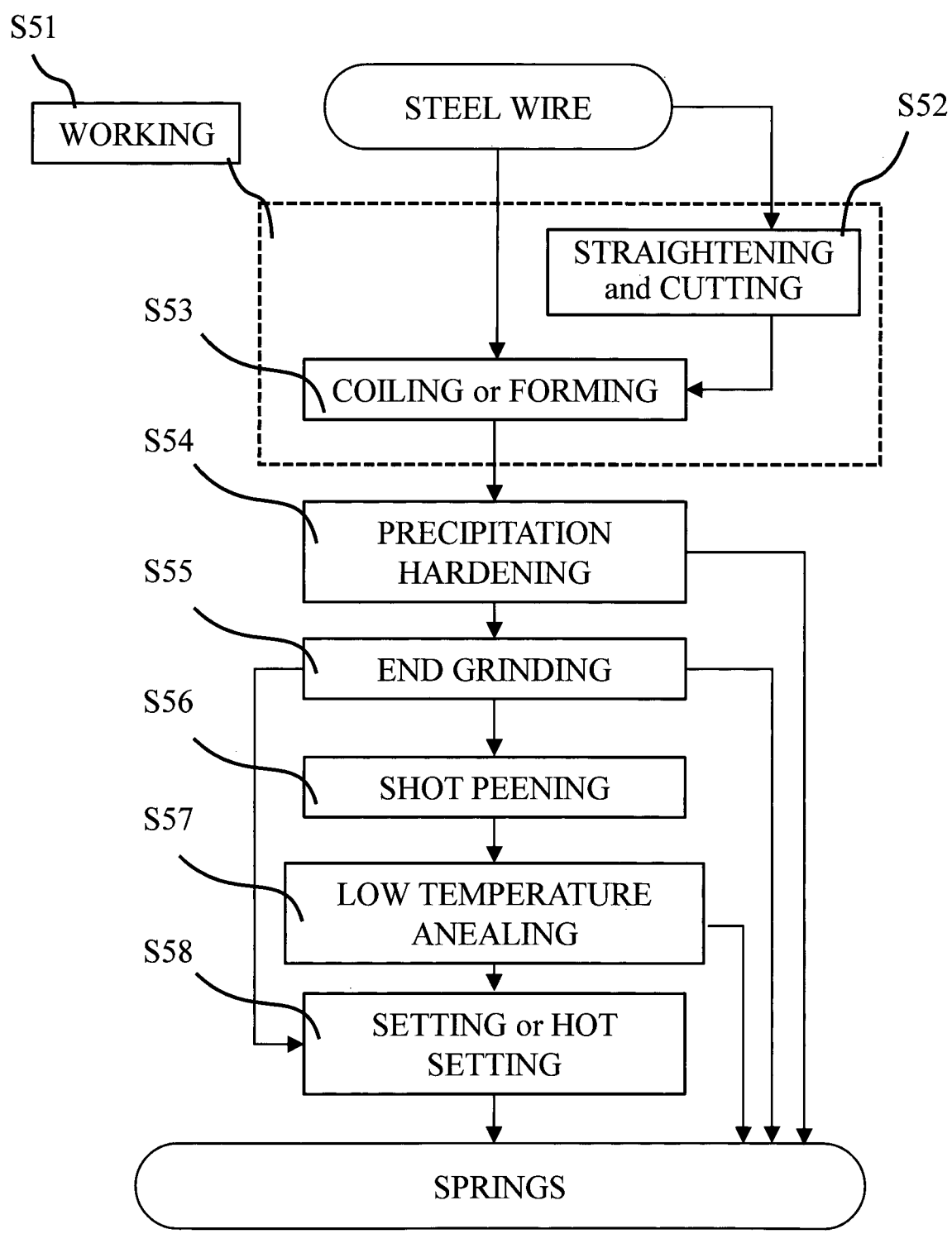
FIG. 4 A flowchart showing an example of method for manufacturing spring using the inventive steel wire.

In a case in which the method is a method for manufacturing a spring, as shown in FIG. 4, the working S51 is
(S53) coiling or forming, or
(S52) straightening and cutting, and (S53) coiling or forming the steel wire.

In addition, the method may include after the precipitation hardening S54:
(S55) optionally end grinding;
(S56) optionally shot peening; and (S57) low temperature annealing; and
(S58) optionally setting or hot setting as spring production.

Working S51 is usually coiling or forming S53, but there is the case to take straightening and cutting S52 process, optionally applied before coiling or forming S53 the steel wire.

Figure 5:
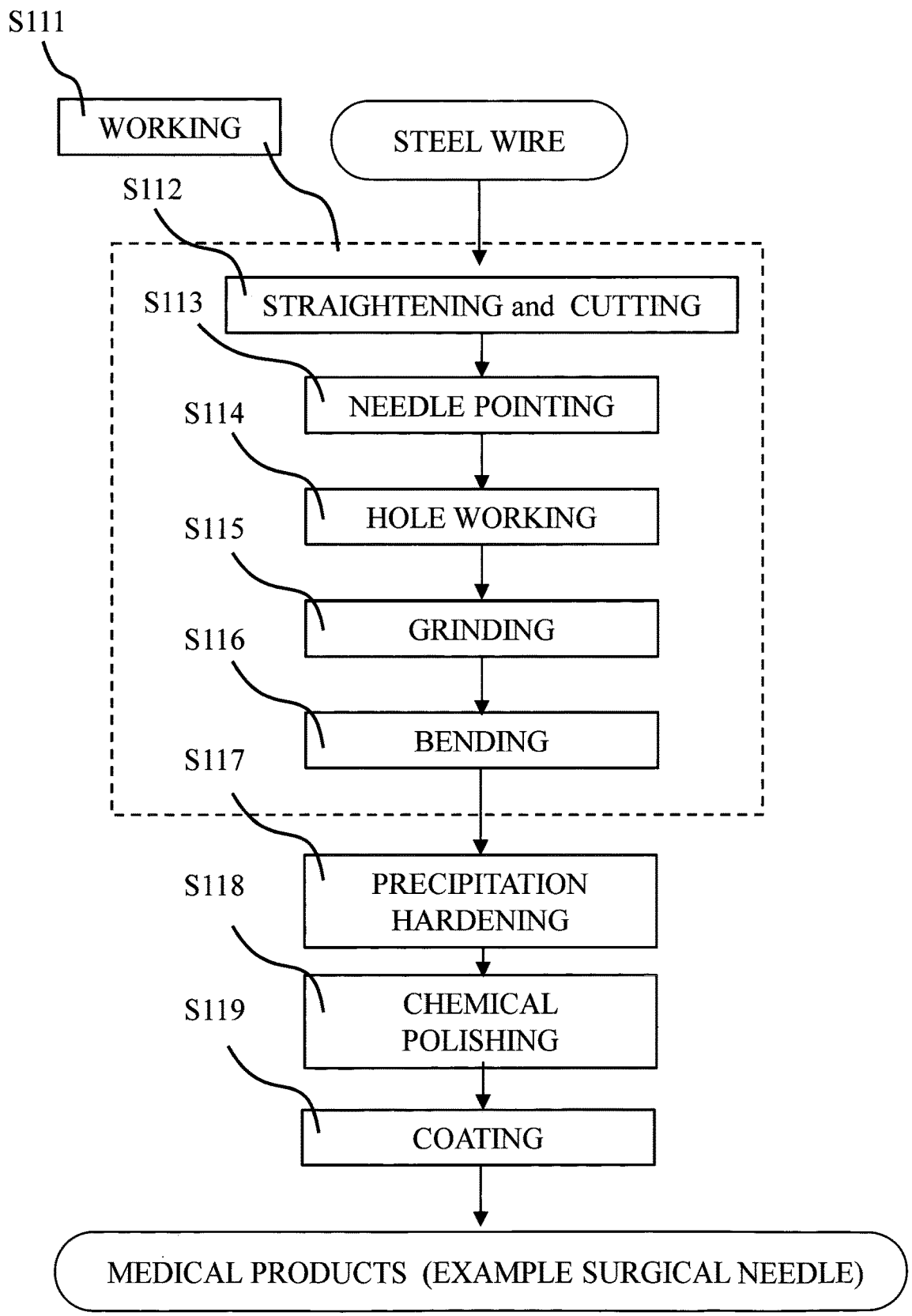
FIG. 5 A flowchart showing an example of method for manufacturing medical products (for example, surgical needle) using the inventive steel wire.

In a case in which the method is a method for manufacturing a surgical needle, as shown in FIG. 5, the working S111 includes:
(S112) straitening, cutting and working the steel wire according to the present invention to obtain surgical needles;
(S113) needle pointing;
(S114) hole working;
(S115) grinding; and
(S116) bending.

In addition, the method further includes:
(S117) precipitation hardening;
(S118) chemical polishing; and
(S119) coating.

The conditions for performing the working S111 and precipitation hardening S117 are not limited, and typical conditions can be applied thereto. Since the steel wire according to the present invention has excellent precipitation hardenability, the medical products obtained from the steel wire has excellent mechanical property with typical precipitation hardening condition.

EXAMPLES

Example 1

An alloy was produced in a conventional way by melting, continuous casting and forging to an ESR-ingot, which was remelted. The remelted ingot was rolled to a wire rod having a diameter of 8.5 mm. The remelted steel had the composition (in wt. %): C: 0.077, Si: 0.39, Mn: 1.19, Cr: 17.61, Ni: 8.81, Al: 1.03, Ti: 0.077, N: 0.011 balance Fe and impurities. The amount of Ni+Cr+Mo of this steel is 26.42 and the CWH is 122.3. The amount of delta ferrite was less than 2.5 vol. % and the rest of the steel matrix consisted of austenite.

The wire rod was subjected to conventional shaving and heat treatment before being drawn to a wire having a diameter of 5.4 mm. Said wire had a martensite content of less than 10 vol. % before it was cooled in liquid nitrogen and drawn to a diameter of 4.75 mm. The martensite content after the drawing was increased to 73 vol. %. The as-drawn wire had a tensile strength ($R_m$) of 1680 MPa, which increased to 2270 MPa after heat treatment at 480° C. for 1 hour. The modulus of elasticity was 185 GPa at as drawn condition and increased by 5.4% after precipitation hardening to 195 GPa.

The inventive alloy was compared to a commercial available steel of the type steel wire 17-7 PH. The comparative steel had the following nominal composition (in wt. %): C: 0.09, Si: 0.70, Mn: 1.0, Cr: 16-18, Ni: 6.5-7.8, Al: 0.7-1.5, balance Fe and impurities.

The comparative steel wire was subjected to the same processing as the inventive steel wire until diameter of 5.40 mm. The drawing to the final diameter of 4.75 mm was made without cryogenic cooling. The as-drawn comparative wire had a tensile strength ($R_m$) of 1310-1550 MPa, which increased to 1580-1800 MPa after precipitation hardening by heat treatment at 480° C. for 1 hour. The modulus of elasticity was 189 GPa at as drawn condition and increased by 4.8% after precipitation hardening to 198 GPa.

Example 2

A wire rod having a diameter of 6.5 mm was produced in the same way as in Example 1. The remelted steel had the composition (in wt. %): C: 0.073, Si: 0.39, Mn: 1.18, Cr: 17.59, Ni: 8.80, Al: 1.05, Ti: 0.079, N: 0.010 balance Fe and impurities. The amount of Ni+Cr+Mo of this steel is 26.39 and the CWH is 122.1. The amount of delta ferrite was less than 2.5 vol. % and the rest of the steel matrix consisted of austenite.

The wire rod was subjected to conventional shaving and heat treatment before being drawn to a wire having a diameter of 4.10 mm. Said wire had a martensite content of less than 10 vol. % before it was cooled in liquid nitrogen and drawn to a diameter of 3.60 mm. The martensite content after the drawing was increased to 71 vol. %. The as-drawn wire had a tensile strength ($R_m$) of 1760 MPa, which increased to 2270 MPa after precipitation hardening by heat treatment at 480° C. for 1 hour. The modulus of elasticity was 184 GPa at as drawn condition and increased by 6.5% after precipitation hardening to 196 GPa.

The inventive steel wire was compared to a commercial available steel wire of the type steel 17-7 PH. The comparative steel wire was subjected to the same processing as the inventive steel wire until diameter of 4.10 mm. The drawing to the final diameter of 3.60 mm was made without cryogenic cooling. The as-drawn wire had a tensile strength ($R_m$) of 1550-1650 MPa, which increased to 1620-1920 MPa after the precipitation hardening by heat treatment at 480° C. for 1 hour. The increasing of the elastic modulus was only 4.3-4.8%.

Examples 1 and 2 reveal that the inventive steel wires could be processed to become high mechanical properties after cryogenic wire drawing and that the inventive steel wires had a much more pronounced increase in the tensile strength ($R_m$) after precipitation hardening than the comparative steel wires.

Example 3

The inventive steel wire is obtained by manufacturing a wire rod, which has a diameter of 6.5 mm, which is produced in the same way as in Example 1, and which has the same chemical composition as in Example 1, light drawing and shaving the wire rod so as to decrease the diameter from 6.5 mm to 5.8 mm, bright annealing the wire rod, intermediate drawing the wire rod so as to decrease the diameter from 5.8 mm to 5.4 mm to obtain an intermediated drawn wire, bright annealing the intermediated drawn wire, Ni plating the intermediated drawn wire (in order to increase spring formability), pre-drawing the intermediated drawn wire so as to decrease the diameter from 5.4 mm to 4.0 mm to obtain a pre-drawn wire, sub-zero cooling the pre-drawn wire, and final drawing the pre-drawn wire so as to decrease the diameter from 4.0 mm to 3.5 mm.

The inventive steel wire was compared to a commercial available steel wire of the type steel 17-7 PH. The chemical composition of the commercial available steel wire is same as the 17-7 PH compared with the inventive steel wire in Example 1. The commercial steel wire is obtained by manufacturing a wire rod with a diameter of 6.4 mm, bright annealing the wire rod, intermediate drawing the wire rod so as to decrease the diameter from 6.4 mm to 5.4 mm to obtain an intermediated drawn wire, bright annealing the intermediated drawn wire, Ni plating the intermediated drawn wire (in order to increase spring formability), and final drawing the intermediated drawn wire so as to decrease the diameter from 5.4 mm to 3.5 mm. The wire rods for the inventive steel wire and the commercial steel wire in "Example 3" are identical to those in above-described "Example 1", respectively.

The results are disclosed in the following table 2. The evaluation was performed in accordance with 14S-N test method disclosed in JSME Code S 002 Standard method of statistical fatigue testing. "50% failure probability" is the fatigue strength by which breakage caused in 50% of samples during Rotating Bending Fatigue Test by Nakamura-type equipment ($10^7$ times). "10% failure probability" is the fatigue strength by which breakage caused in 10% of samples during Rotating Bending Fatigue Test by Nakamura-type equipment ($10^7$ times).

TABLE 3

|  | 50% failure probability | 10% failure probability |
|---|---|---|
| Inventive steel wire | 843 MPa | 794 MPa |
| Commercial available steel wire (17-7 PH) | 837 MPa | 787 MPa |

As shown in table 2, the inventive steel wire has excellent fatigue properties in comparison to the steel wire of 17-7 PH.

Example 4

The inventive steel wire and commercial available steel wire of the type steel 17-7 PH of the above-described "Example 3" are manufactured and the corrosion resistance of the steel wires were evaluated in accordance with JIS G 0577 "Methods of pitting potential measurement for stainless steels". The results are shown in the table 3.

TABLE 4

Results of pitting potential measurement test ($V'_{c200}$, n = 3)

|  | Range of measurement value (V) | Average value (V) |
|---|---|---|
| Inventive steel wire | 0.181 to 0.233 | 0.214 |
| Commercial available steel wire (17-7 PH) | 0.175 to 0.235 | 0.211 |

As shown in the table 3, the corrosion resistance of the inventive steel wire is similar to the commercial available steel wire. In view of the Examples 1 to 4, the inventive steel wire has improved mechanical properties while the corrosion resistance is similar to the conventional steel wire.

Example 4

The method for manufacturing the inventive steel wire may not include sub-zero cooling. The inventive examples obtained by the manufacturing method without sub-zero cooling are as follows.

Inventive Example 4-1

The inventive steel wire 4-1 is obtained by manufacturing a wire rod which has a diameter of 6.5 mm, is produced in the same way as in Example 1, and has the same chemical composition as in Example 1, first intermediate drawing the wire rod so as to decrease the diameter from 6.5 mm to 4.8 mm to obtain a first intermediated drawn wire, bright annealing the first intermediated drawn wire, second intermediate drawing the first intermediated drawn wire so as to decrease the diameter from 4.8 mm to 2.4 mm to obtain a second intermediated drawn wire, bright annealing the second intermediated drawn wire, third intermediate drawing the second intermediated drawn wire so as to decrease the diameter from 2.4 mm to 1.20 mm to obtain a third intermediated drawn wire, bright annealing the third intermediated drawn wire, and final drawing the third intermediated drawn wire so as to decrease the diameter from 1.20 mm to 0.34 mm.

TABLE 5

Mechanical property and VFM of inventive example 4-1

| | Third intermediated drawn wire (φ 1.20 mm) after bright annealing | Steel wire (φ 0.34 mm) after final drawing | Steel wire after precipitation hardening at 480° C. for 1 hours |
|---|---|---|---|
| Tensile strength (MPa) | 747 | 2230 | 2587 |
| Elongation (%) | 51.2 | 1.6 | 1.4 |
| Reduction of area (%) | 83.0 | 49.9 | 49.9 |
| Modulus of longitudinal elasticity (GPa) | 175 | 176 | 196 |
| VFM (%) | 0.3 | 66.7 | — |

The VFM for "Third intermediated drawn wire (φ1.20 mm) after bright annealing" is substantially equal to an amount of delta ferrite, and The VFM for "Steel wire (φ0.34 mm) after final drawing" includes the amount of delta ferrite and an amount of strain-induced martensite. Accordingly, the amount of strain-induced martensite in the "Steel wire (φ0.34 mm) after final drawing" is assumed as 66.4%.

Inventive Example 4-2

The inventive steel wire 4-2 is obtained by manufacturing a wire rod which has a diameter of 6.5 mm, is produced in the same way as in Example 1, and has the same chemical composition as in Example 1, first intermediate drawing the wire rod so as to decrease the diameter from 6.5 mm to 4.8 mm to obtain a first intermediated drawn wire, bright annealing the first intermediated drawn wire, second intermediate drawing the first intermediated drawn wire so as to decrease the diameter from 4.8 mm to 2.6 mm to obtain a second intermediated drawn wire, bright annealing the second intermediated drawn wire, third intermediate drawing the second intermediated drawn wire so as to decrease the diameter from 2.6 mm to 1.4 mm to obtain a third intermediated drawn wire, bright annealing the third intermediated drawn wire, and final drawing the third intermediated drawn wire so as to decrease the diameter from 1.4 mm to 0.34 mm.

TABLE 6

Mechanical property and VFM of inventive example 4-2

| | Third intermediated drawn wire (φ 1.40 mm) after bright annealing | Steel wire (φ 0.34 mm) after final drawing | Steel wire after precipitation hardening at 480° C. for 1 hours |
|---|---|---|---|
| Tensile strength (MPa) | 713 | 2340 | 2759 |
| Elongation (%) | 51.0 | 2.1 | 1.2 |
| Reduction of area (%) | 86.3 | 51.3 | 48.2 |
| Modulus of longitudinal elasticity (GPa) | 179 | 168 | 197 |
| VFM (%) | 0.2 | 74.7 | — |

The VFM for "Third intermediated drawn wire (φ1.40 mm) after bright annealing" is substantially equal to an amount of delta ferrite, and The VFM for "Steel wire (φ0.34 mm) after final drawing" includes the amount of delta ferrite and an amount of strain-induced martensite. Accordingly, the amount of strain-induced martensite in the "Steel wire (φ0.34 mm) after final drawing" is assumed as 74.5%.

As shown in tables 4 and 5, the manufacturing methods in which the total working rate during the drawing at room temperature is 92 to 94% can form 67 to 75% of strain-induced martensite without the sub-zero cooling. The amount of the strain-induced martensite in examples 4-1 and 4-2 is similar to a steel wire having a diameter of 3.5 mm and obtained by sub-zero cooling and drawing. Moreover, the tensile strength of the inventive examples 4-1 and 4-2 can be further increased by the precipitation hardening. Accordingly, the method for manufacturing the steel wire which does not include sub-zero cooling can provide the inventive steel wire, which has improved mechanical properties and which is suitable for springs or medical wire products.

INDUSTRIAL APPLICABILITY

The steel of the present invention is useful for parts requiring high mechanical properties. It is particular useful for compression springs in diesel injection fuel pumps or medical wire products as surgical suture needles, blood lancets and dental tools.

REFERENCE SIGNS LIST

S1 Melting
S2 ESR, VAR, EBR and/or PAR (Remelting)
S3 Hot working
S4 Light drawing and Shaving
S5 Annealing
S6 Intermediate drawing
S7 Annealing
S8 Pre-drawing
S9 Sub-zero cooling
S10 Final drawing
s1 Melting
s2 ESR, VAR, EBR and/or PAR (Remelting)
s3 Hot working
s4 Light drawing and Shaving
s5 Annealing
s6 Intermediate drawing
s7 Annealing
s8 Final drawing
S51 Working
S52 Straightening and Cutting
S53 Coiling or Forming
S54 Precipitation hardening
S55 End grinding
S56 Shot peening
S57 Low temperature annealing
S58 Setting or Hot setting
S111 Working
S112 Straightening and Cutting
S113 Needle pointing
S114 Hole working
S115 Grinding
S116 Bending
S117 Precipitation Hardening
S118 Chemical polishing
S119 Coating
A Inclusion
B Axis direction

The invention claimed is:

1. A steel wire suitable for making a spring or medical wire products, consisting of, in weight %:

| | |
|---|---|
| C | 0.02 to 0.15 |
| Si | 0.1 to 0.9 |
| Mn | 0.8 to 1.6 |
| Cr | 16 to 20 |
| Ni | 7.5 to 10.5 |
| Mo | ≤3 |
| W | ≤0.5 |
| Co | ≤1 |
| Al | 0.5 to 2.5 |
| Ti | ≤0.15 |
| V | ≤0.1 |
| Nb | ≤0.1 |
| Zr | ≤0.1 |
| Ta | ≤0.1 |
| Hf | ≤0.1 |
| Y | ≤0.1 |
| N | ≤0.05 |
| B | ≤0.01 |
| Cu | ≤2.5 |
| S | ≤0.05 |
| P | ≤0.05 |
| Ca | ≤0.01 |
| Mg | ≤0.01 |
| REM | ≤0.2, | and

Fe and impurities balance, wherein the total amount of Cr and Ni is 25 to 27 wt. %, and wherein the steel wire has a microstructure including in volume %:

| | |
|---|---|
| martensite | 40 to 90 |
| austenite | 10 to 60, and |
| delta ferrite | ≤5. |

2. The steel wire according to claim 1,
wherein the steel wire consists of:

| | |
|---|---|
| C | 0.04 to 0.08 |
| Si | 0.2 to 0.8 |
| Mn | 0.9 to 1.5 |
| Cr | 17.2 to 18.5 |
| Ni | 8.2 to 9.5 |
| Mo | ≤2 |
| W | ≤0.1 |
| Co | ≤0.3 |
| Al | 0.95 to 1.35 |
| Ti | 0.03 to 0.12 |
| V | ≤0.1 |
| Nb | ≤0.05 |
| Zr | ≤0.05 |
| Ta | ≤0.05 |
| Hf | ≤0.05 |
| Y | ≤0.05 |
| N | ≤0.018 |
| B | ≤0.005 |
| Cu | ≤0.3, and |
| S | ≤0.005, | optionally, wherein the steel wire has the microstructure including in volume % the martensite 50 to 80 the austenite 20 to 50, and the delta ferrite ≤3 and optionally, wherein the steel wire fulfils one or both of $M_{d30}$(° C.)=−40 to 10, and CWH=113 to 133, in which $M_{d30}$ and CWH are calculated by the following equations, $M_{d30}$ (° C.)=551−462×(C+N)−9.2×Si−8.1×Mn−13.7×Cr−29×(Ni+Cu) 68×Nb−1.42×(ASTM Grain Size−8.0)

CWH=392−7.3×Cr−17.2×Ni+135×C.

3. The steel wire according to claim 1, wherein the steel wire fulfils at least one of the following requirements:

| | |
|---|---|
| C | 0.06 to 0.08 |
| Si | 0.25 to 0.75 |
| Mn | 0.9 to 1.5 |
| Cr | 17.4 to 18.2 |
| Ni | 8.5 to 9.1 |
| Mo | ≤2 |
| W | ≤0.1 |
| Al | 1.00 to 1.30 |
| Ti | 0.05 to 0.10 |
| N | 0.004 to 0.017 |
| Cu | ≤0.3, and |
| S | ≤0.003 | optionally, wherein the steel wire has a microstructure including in volume %:

the martensite 50 to 80, and the austenite 20 to 50 and optionally, wherein the steel wire fulfils at least one of $M_{d30}$ (° C.)=−20 to 0, and CWH=118 to 130.

4. The steel wire according to claim 3, wherein the steel wire fulfils at least one of the following requirements:

| | |
|---|---|
| C | 0.06 to 0.08 |
| Si | 0.25 to 0.75 |
| Mn | 0.9 to 1.5 |
| Cr | 17.4 to 18.2 |
| Ni | 8.5 to 9.1 |
| Mo | ≤1 |
| W | ≤0.1 |
| Al | 1.00 to 1.30 |
| Ti | 0.05 to 0.10 |
| Cu | ≤0.3, and |
| S | ≤0.003, | optionally, wherein the steel wire has a microstructure including in volume %:

the martensite 50 to 80, and the austenite 20 to 50 and optionally, wherein the steel wire fulfils at least one of $M_{d30}$ (° C.)=−12 to −2, and CWH=120 to 126.

5. The steel wire according to claim 1,
wherein the steel wire has a cleanliness fulfilling the following maximum requirements with respect to non-metallic inclusions according to ASTM E45-97, Method A:

TABLE 7

| A | A | B | B | C | C | D | D |
|---|---|---|---|---|---|---|---|
| T | H | T | H | T | H | T | H |
| 1.0 | 0 | 1.5 | 1.0 | 0 | 0 | 1.5 | 1.0 | wherein "A" represents an inclusion Type A according to ASTM E45-97, "B" represents an inclusion Type B according to ASTM E45-97, "C" represents an inclusion Type C according to ASTM E45-97, "D" represents an inclusion Type D according to ASTM E45-97, "T" represents a "Thin series" of the inclusion according to ASTM E45-97, and "H" represents a "Heavy series" of the inclusion according to ASTM E45-97.

6. The steel wire according to claim 5, wherein a number of non-metallic inclusions having a maximum size within the range of 10 to 15 μm in a 350 mm² large inspected area is ≤10.

7. The steel wire according to claim 5, wherein a number of non-metallic inclusions having a maximum size larger than 15 μm is 0 in in a 350 mm² large inspected area.

8. The steel wire according to claim 1, wherein the wire consists of:

| | |
|---|---|
| C | 0.02 to 0.09 |
| Si | 0.1 to 0.9 |
| Mn | 0.8 to 1.6 |
| Cr | 17 to 19 |
| Ni | 8 to 10 |
| Mo | ≤1 |
| W | ≤0.5 |
| Co | ≤1 |
| Al | 0.9 to 1.4 |
| Ti | ≤0.15 |
| V | ≤0.1 |
| Nb | ≤0.1 |
| Zr | ≤0.1 |
| Ta | ≤0.1 |
| Hf | ≤0.1 |
| Y | ≤0.1 |
| N | ≤0.02 |
| B | ≤0.01 |
| Cu | ≤2.5 |
| S | ≤0.05 |
| P | ≤0.05 |
| Ca | ≤0.01 |
| Mg | ≤0.01 |
| REM | ≤0.2, | and
Fe and impurities balance.

9. A method for manufacturing a steel wire according to claim 1, comprising:
melting a raw material having a composition as described above to obtain an ingot or a billet;
optionally, subjecting the ingot or the billet to one or more selected from the group consisting of Electro Slag Remelting method, Vacuum Arc Remelting method, Electron Beam Remelting method, and Plasma Arc Remelting method;
hot working the ingot or the billet to obtain a wire rod;
optionally, shaving the wire rod;
optionally, annealing the shaved wire rod;
intermediate drawing the wire rod to obtain an intermediate drawn wire having an intermediate diameter;
annealing the intermediate drawn wire;
pre-drawing the intermediate drawn wire to obtain a pre-drawn wire having a pre diameter;
sub-zero cooling the pre-drawn wire; and
final drawing the pre-drawn wire to obtain the steel wire having a final diameter.

10. The method for manufacturing the steel wire according to claim 9, wherein a working rate during the pre-drawing the intermediate drawn wire is 30 to 60%.

11. The method for manufacturing the steel wire according to claim 9, wherein the surface temperature of the pre-drawn wire just before the final drawing is −130 to −196° C., and
wherein a working rate during the final drawing the pre-drawn wire is 10 to 30%.

12. A method for manufacturing a spring or medical wire products, comprising:
manufacturing a steel wire by the method according to claim 9,
working the steel wire to obtain a shape of the spring or the medical wire products; and
precipitation hardening the spring or the medical wire products.

13. A method for manufacturing a steel wire according to claim 1, comprising:
melting a raw material having a composition as described above to obtain an ingot or a billet;
optionally, subjecting the ingot or the billet to one or more selected from the group consisting of Electro Slag Remelting method, Vacuum Arc Remelting method, Electron Beam Remelting method, and Plasma Arc Remelting method;
hot working the ingot or the billet to obtain a wire rod;
optionally, shaving the wire rod;
optionally, annealing the shaved wire rod;
optionally, one or more times of intermediate drawing the wire rod to obtain an intermediate drawn wire having an intermediate diameter;
optionally, one or more times of annealing the intermediate drawn wire; and
final drawing the wire rod, the shaved wire rod, or the intermediate drawn wire to obtain the steel wire having a final diameter.

14. The method for manufacturing the steel wire according to claim 13, wherein a working rate during the final drawing is 70 to 96%.

15. A method for manufacturing a spring or medical wire products, comprising:
manufacturing a steel wire by the method according to claim 13, working the steel wire to obtain a shape of the spring or the medical wire products; and precipitation hardening the spring or the medical wire products.

16. A method for manufacturing a spring or medical wire products, comprising:
working the steel wire according to claim 1 to obtain a shape of the spring or the medical wire products; and
precipitation hardening the spring or the medical wire products.

* * * * *